Feb. 1, 1927.
A. TURCOTTE
SAW TOOL
Filed July 6, 1926
1,616,340
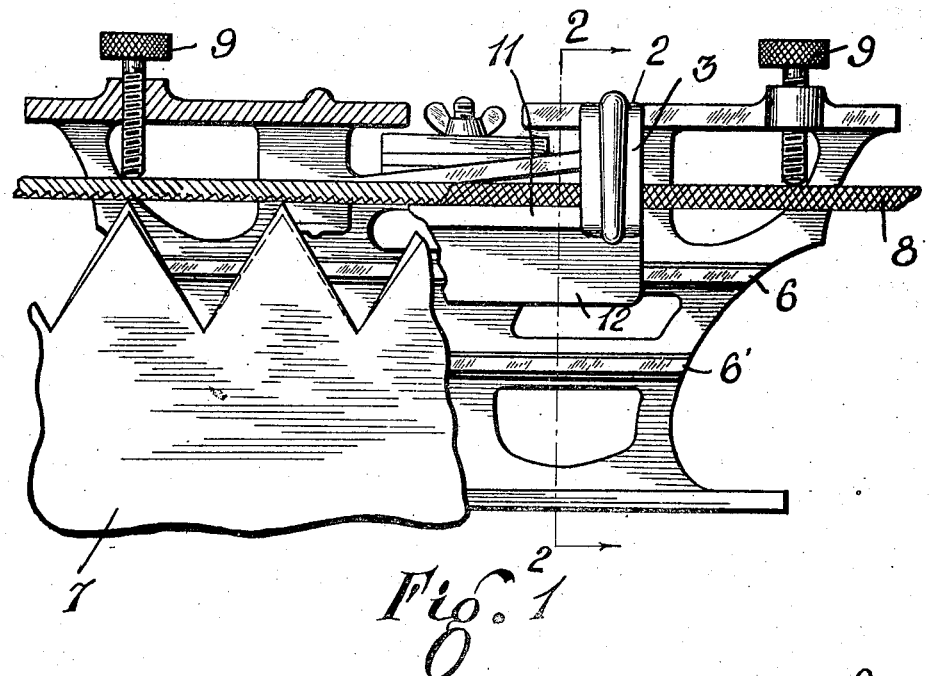
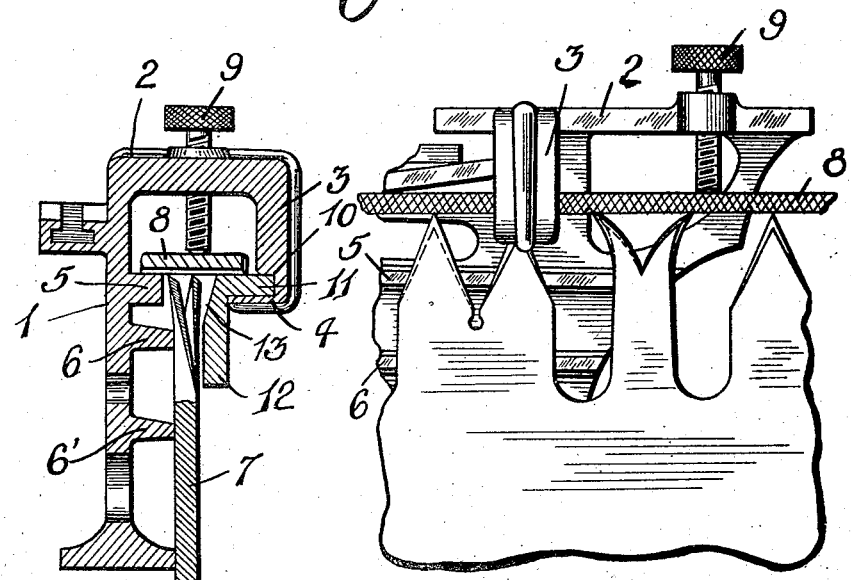
Inventor
Adélard Turcotte
By Marion & Marion
Attorneys Patented Feb. 1, 1927.

1,616,340

UNITED STATES PATENT OFFICE.

ADELARD TURCOTTE, OF ST. JUST OF BRETONNIERES, QUEBEC, CANADA.

SAW TOOL.

Application filed July 6, 1926. Serial No. 120,809, and in Canada November 12, 1925.

The present invention pertains to a novel saw tool designed particularly for breasting or levelling the teeth of saws.

The principal object of the invention is the provision of a device of this character adapted for use on saws of small width, whereas previous devices designed for this purpose are applicable only to thick or heavy saws.

The levelling device which is already known is in the form of a gage having a space defined by a ledge and a lip over which is clamped a file. The space is intended to receive a saw in such a manner that the teeth thereof are engaged by the file. The space between the ledge and the lip is however of such great width that only a thick saw is conveniently accommodated therein. If such a device were applied to a thin saw the tool would shift during the reciprocation thereof over the teeth of the saw and would thereby render the operation inaccurate.

In order to adapt this device to narrower saws, the invention provides for the application of a guide bar insertable in the lip. This bar restricts the space between the ledge of the lip, thereby rendering the tool suitable for smaller saws. Another feature of the invention is the provision of supplemental ribs carried by the body of the tool for guidance along the blade of the saw.

The invention is fully disclosed in the following description and in the accompanying drawings in which:

Figure 1 is a front elevation of the device, parts being broken away;

Figure 2 is a vertical section on the line 2—2 of Figure 1; and

Figure 3 is a side elevation of the device as previously used in the art without the application of the auxiliary guide member.

Reference to these views will now be made by use of like characters which are employed to designate corresponding parts throughout.

The device comprises a side 1 having a top part 2 from which extends an overhanging lip having one part 3 parallel to the side 1 and another part 4 perpendicular to the first part. Along a line opposite the part 4, the side 1 carries a ledge 5 for the purpose more particularly pointed out below. The side is formed with a rib 6 lying beneath the ledge in parallel relation thereto and adapted to engage a saw 7 to which the tool is applied.

The device as now known in the art has the upper surface of the portion 4 in alinement with the ledge 5 so that a file 8 may be laid on these two parts. The file is clamped in this position by means of thumb screws 9 passed through the top 2. The space between the portion 4 and the ledge 5 is of such width as to accommodate a thick saw. The tool is placed over the saw, which is held in a vise, and the file 8 is laid on the teeth of the saw. With the rib 6 engaging the saw blade, the tool is reciprocated until the teeth are breasted.

By means of the present invention, this tool is adapted to accommodate saws of smaller width. For this purpose a recess 10 is cut in the overhanging lip between the parts 3 and 4. In this lip is received one leg 11 of an angle bar, the remaining leg 12 of which hangs downwardly in parallel relation with the side 1. The lip thus serves to restrict the space between the ledge 5 of the portion 4, so that when the tool is applied to a narrower saw, it will be properly guided in its movement. Also, another rib 6′ is provided beneath the rib 6 in order to further aid the guiding of the tool. The corner of the angular guide bar is cut away exteriorly as at 13 in order to avoid obstruction by the saw in case the teeth thereof are bent laterally from the saw blade. It will be evident that guide bars of various thicknesses may be provided for use in connection with different sizes of saws.

While a specific embodiment of the invention has been illustrated and dscribed, it is to be understood that various alterations in the details of construction may be made without departing from the spirit of the invention as indicated by the appended claims.

Having thus fully described the invention, what I claim as new and desire to protect by Letters Patent is:

1. A saw tool comprising a side, a top, an angular lip overhanging from said top and having a recess cut in the vertex thereof, a ledge projecting from said side and disposed opposite said lip, in combination with an auxiliary guide member consisting of an angular bar having one side received in said recess and the other side lying parallel to the side of the tool in spaced relation thereto, and means for clamping a file upon said ledge and guide member.

2. A saw tool comprising a side, a top, a lip overhanging from said top, a ledge projecting from said side and disposed opposite said lip, in combination with an auxiliary guide member consisting of an angular bar having one side received in said lip and the other side lying parallel to the side of the tool in spaced relation thereto, the exterior corner of said bar being cut away for the purpose described, and means for clamping a file upon said ledge and guide member.

In witness whereof I have hereunto set my hand.

ADELARD TURCOTTE.